United States Patent
Asta

(10) Patent No.: US 7,172,283 B1
(45) Date of Patent: Feb. 6, 2007

(54) MAGNETIC EYEGLASS DEVICE

(76) Inventor: Kathleen M. Asta, 283 Hill Ave., Bartlett, IL (US) 60103

(*) Notice: Subject to any disclaimer, the term of this patent is extended or adjusted under 35 U.S.C. 154(b) by 0 days.

(21) Appl. No.: 11/402,071

(22) Filed: Apr. 11, 2006

(51) Int. Cl.
*G02C 5/14* (2006.01)

(52) U.S. Cl. .................. 351/112; 351/111; 351/121; 24/3.3

(58) Field of Classification Search ............. 351/111, 351/112, 121, 41, 158; 24/3.3
See application file for complete search history.

(56) References Cited

U.S. PATENT DOCUMENTS 6,568,805 B1 * 5/2003 Dietz .................... 351/112
6,848,787 B2 * 2/2005 Dietz .................... 351/112

* cited by examiner

*Primary Examiner*—Hung Xuan Dang
(74) *Attorney, Agent, or Firm*—Meroni + Meroni; Charles F. Meroni, Jr.; Chris Scott

(57) ABSTRACT

A magnetic device enables user to affix eyeglasses to articles of clothing worn by the user. The device comprises a strong pair of magnets, covered in a non-ferrous shell of various material compositions, each shell being fitted with two pliable, flexible rings for attachment to the eyeglass frames. The rings are made of flexible material so that they can be repeatedly bent or stretched, without fracturing, while the device is being fitted or removed form the eyeglass frames. The shells, when attached to each arm or temple support of the eyeglass frame, magnetically connect together when the eyeglass frames are in the closed position, forming a tight hold whenever the glasses are clasped together. The closed eyeglasses, in combination with the invention of the present invention, can then be easily and securely attached or retained to a belt, pocket, purse, or to an article of clothing.

11 Claims, 2 Drawing Sheets

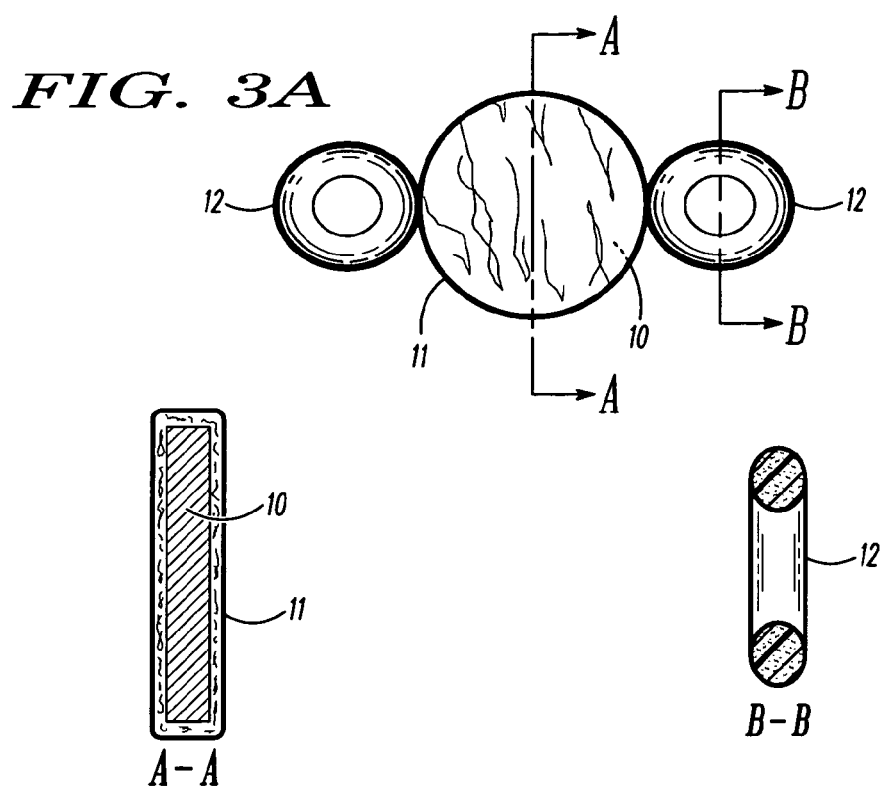
*FIG. 3A*
*FIG. 3B*  *FIG. 3C*
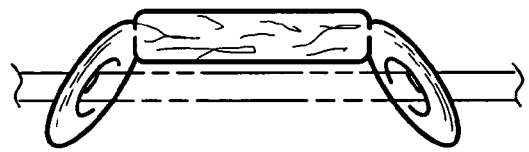
*FIG. 3D*
*FIG. 3E*
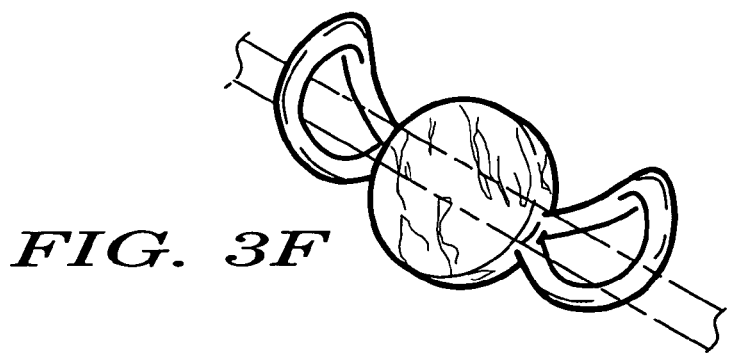
*FIG. 3F*

MAGNETIC EYEGLASS DEVICE

BACKGROUND OF INVENTION

1. Field of the Invention

This invention relates to magnetically securing eyeglasses to a users' person, specifically to prevent loss, damage or breakage of eyeglasses.

2. Description of the Prior Art

When people who wear eyeglasses have a continuous need to put their eyeglasses on and off, they need to have those eyeglasses at their disposal. It is easy for eyeglasses to be lost, damaged or broken without this invention. Although there might be prior inventions of eyeglass clips, this present invention is made of different materials. The prior eyeglass clips need some assembly by the user. The clips can scratch the user when attached to their clothing. Clips can snag clothing. The clip pieces could break or get lost easily, and would be a hassle to connect the pieces. Past and present experience with observing people, plus the inventor's own experience, has taught the author that trying to place eyeglasses on one's clothing or on top of the head often results in the eyeglasses falling on the floor and becoming broken, or damaged. In addition, eyeglasses are set down near the user only to be lost, broken or stolen. This led to the creation of the present invention.

SUMMARY OF THE INVENTION

Accordingly, besides the objects and advantages of the eyeglass clips described above, several objects and advantages of the present invention are: to provide keeping eyeglasses securely in place on the users' clothing or purse strap; to provide prevention of eyeglass loss, damage or breakage; to provide a comfortable feel when attached to the user, which will not have any sharp edges or disconnecting pieces; to provide variation of color to match a person's clothing or frames; to provide variation of size to fit wire, metal, or plastic frames; and to provide an eyeglass device to stay securely on a user's eyeglass frames, yet be easily attached or removed by the user. Further objects and advantages are to provide the present eyeglass device to be simple to use and inexpensive to manufacture.

In accordance with the present invention, the magnetic eyeglass device comprises a pair of magnets covered by material of varying types using a hinge ring to affix themselves to arms of eyeglass frames. When the eyeglass frames are closed, this brings the power magnets together, forming a secure closure.

BRIEF DESCRIPTION OF THE DRAWINGS

Other features of my invention will become more evident from a consideration of the following brief description of my patent drawings, as follows:

FIG. 3A is front view of device.

FIG. 3B is a cut-away view of the magnet and covering component of the device.

FIG. 3C is a cut-away view of the hinge ring.

FIG. 3D is a flat side view of device with hinge rings in flat position.

FIG. 3E is a flat side view of device with hinge rings in bent or flexed position.

FIG. 3F is a three-dimensional view of device properly attached to eyeglass frames, showing flexibility.

DETAILED DESCRIPTION OF THE PREFERRED EMBODIMENT(S)

Figure 2:
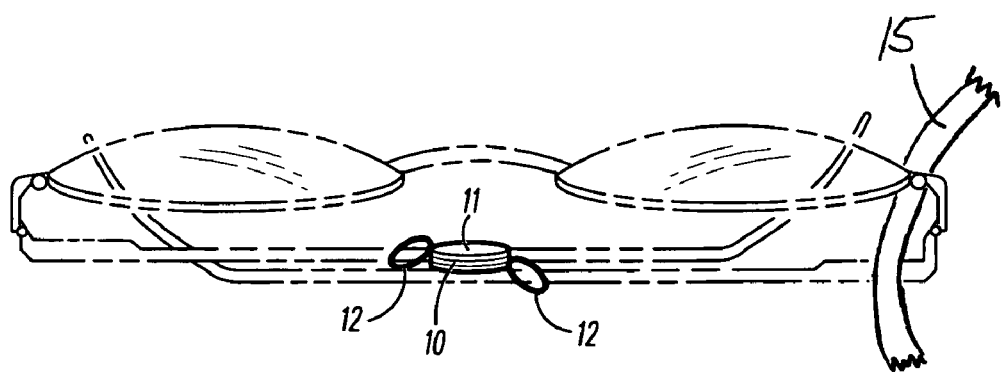
FIG. 2 is a folded perspective view of eyeglass frames with FIG. 3A power magnet devices secured in place and a fragmentary view of a belt support structure.

The magnetic device of the present invention enables a user to affix eyeglasses to articles of clothing worn by the user. The device comprises a strong pair of magnets, covered in a non-ferrous shell of various material compositions, each shell being fitted with two pliable, flexible rings for attachment to the eyeglass frames. The rings are made of flexible material so that they can be repeatedly bent or stretched, without fracturing, while the device is being fitted or removed form the eyeglass frames. The shells, when attached to each arm or temple support of the eyeglass frame, magnetically connect together when the eyeglass frames are in the closed position, forming a tight hold whenever the glasses are clasped together. The closed eyeglasses, in combination with the invention of the present invention, can then be easily and securely attached or retained to a belt 15 (as depicted in FIG. 2), pocket, purse, or to any similar article of clothing or support structure.

Figure 1:
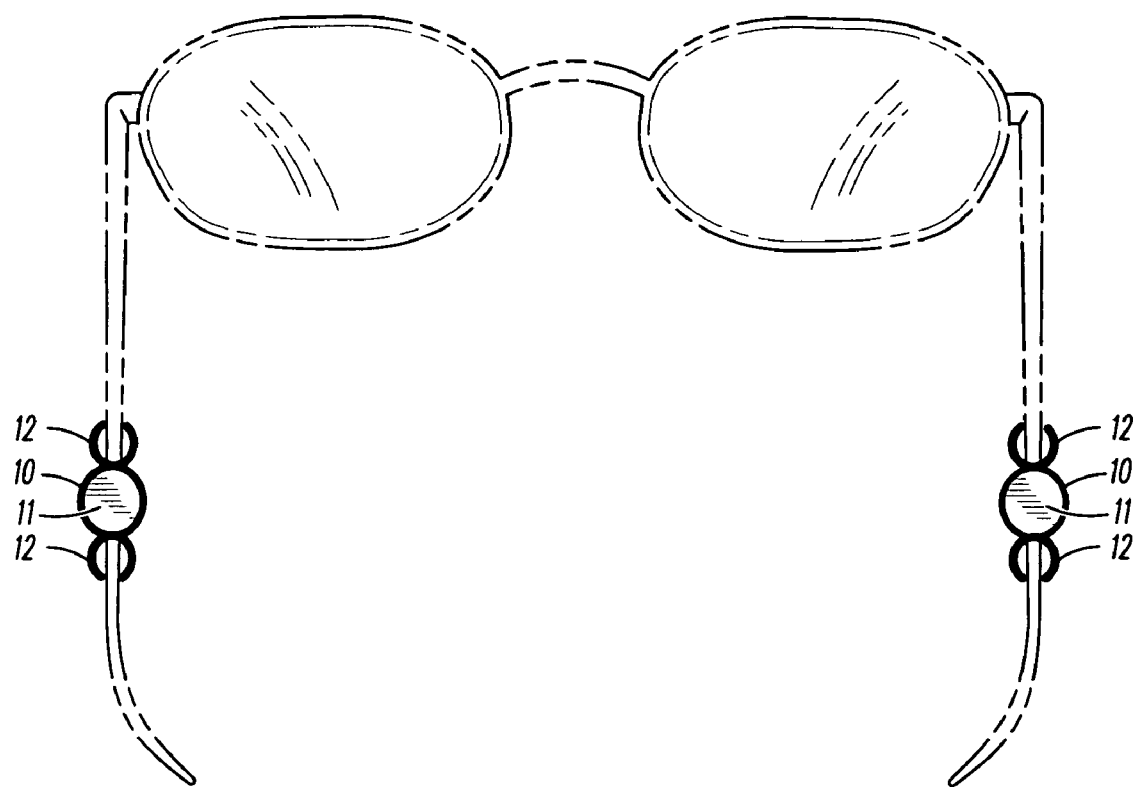
FIG. 1 is a perspective view of FIG. 3A magnetic devices attached to the arms of the eyeglass frames.

A preferred embodiment of the magnetic device of the present invention is illustrated in FIGS. 1–3F. FIG. 1 shows the device attached to temple structures of an eyeglass assemblage. From an inspection of FIG. 3A, it will be seen that a preferred embodiment of the magnetic device of the present invention is there illustrated (front view). Fabric, 11 is sewn over and around power magnets, 10 with continual sewing onto 12, partial part of hinge rings for attaching and completing invention. Variation of colored fabric, leather, or any durable covering for magnets can be used, or molding together as a whole instead of hinge rings. Hinge rings, 12 can be of different sizes and construction to fit arms of wire, metal or plastic eyeglass frames.

A preferred embodiment of the magnetic device of the present invention is illustrated in FIG. 3B with a flat-side cut-away view of 10 and 11. FIG. 3C illustrates a flat side cut-away view of 12. Illustrated also is FIG. 3E with a flat-side bent hinge ring view. FIG. 3F illustrates a three dimensional view with bent hinge rings for showing flexibility. The magnets would typically be $5/16$ of an inch in diameter and the hinge rings would typically be $1/4$ of an inch in diameter, or somewhat larger to fit a variety of frame sizes. Other types of materials may also be used as well. The typically used fabric should be slightly larger than the magnet for enough space for sewing purposes around magnets and attaching hinge rings.

Operation—FIGS. 1, 2, and 3A–3F

The manner of using the pair of magnetic eyeglass devices, FIG. 3A is to slide the first set of hinge rings, 12 onto each arm of the eyeglass frame, place one folded arm inside and one folded arm outside of clothing. Slightly move one magnet, FIG. 3A over to connect with the other magnet, FIG. 3A using the touch of a finger. This pair of magnetic eyeglass devices can be worn on the neck line or pocket of a shirt, sweater top, thick sweater, thin jacket, pant belt loop, strap of a purse, backpack, front or back pocket of pants or jeans, etc.

The user of the present invention can leave the magnetic devices on frames while wearing eyeglasses on their eyes or can take them off easily by sliding the magnetic device off of the arms of the frames. The magnetic devices will not detach on their own because of the grip of the rubber hinge rings, 12 or various materials that can be used as previously described in the detailed description preferred embodiments section of this application.

It will thus be seen that the present invention discloses an eyeglass closure maintenance system comprising the combination of an eyeglass assembly as generally depicted in FIGS. 1 and 2, and two magnet assemblies as generally depicted in FIGS. 1–3F. The eyeglass assembly essentially comprises two temple supports and a bow portion. The temple supports are preferably jointedly attached to opposite ends of the bow portion and are foldable into a closed temple support position as generally depicted in FIG. 2. It will be seen from an inspection of FIG. 2 that the temple supports extend in opposite directions in adjacency to one another when in the closed temple support position.

The magnet assemblies each comprise a magnetic member 10 and certain support-attaching means. A selected magnet assembly may thus be attached to each temple support via the support-attaching means such that the magnetic members are juxtaposed to one another when in the closed temple support position. The magnetic members function to magnetically maintain the temple supports in the closed temple support position via cooperative magnetic force extending therebetween.

Some form of eyeglass-positioning means or eyeglass-supporting means (such as a neck line or pocket of a shirt, sweater top, thick sweater, thin jacket, pant belt loop, strap of a purse, backpack, front or back pocket of pants or jeans, etc.) may thus extend intermediate the bow portion and the temple supports when in the closed temple support position for supporting the eyeglass assembly when in the closed temple support position. The eyeglass-positioning means may thus be cooperatively associated with the closed temple support position for positioning the magnet assemblies in a selectively fixed spatial location.

The eyeglasses with attached magnetic devices will always be secured in place when a user is cleaning, bending down, jogging, biking, and other activities. Thus, since the eyeglasses are secured in place, this prevents eyeglasses from breakage, loss, or damage when not in use on the user's eyes.

CONCLUSION, RAMIFICATIONS, AND SCOPE

Accordingly, the reader will see that the user can easily attach the magnetic eyeglass devices of this invention to the arms of the eyeglass frames. In addition, the user can attach eyeglasses to their person for a convenient, secure fit. Furthermore, the magnetic eyeglass device has the additional advantages in that: it allows a lightweight feel on the user's frames; it provides a smaller size to avoid an uncomfortable obstruction to peripheral vision; it permits flexibility for the attaching and un-attaching onto eyeglass frames; it allows an interchangeable fit for users' different eyeglass frames; it allows for a variety of color to match the user's frames and, or clothing; it provides a smooth finish without sharp edges for a user's safety when attached to a user's clothing (this also prevents snagging on clothing); and it allows one pair of finished devices to avoid any kind of assembly or lost pieces.

Although the description above contains much specificity, these should not be construed as limiting the scope of the invention but as merely providing illustrating of some of the presently preferred embodiments of this invention. For example, the magnetic devices can have other shapes, such as oval, square, rectangular, triangular, etc. The covering of the magnets can be made of different materials, such as nylons, thin rubber, plastics, or other fabrics, such as leather, or any durable covering. Hinge rings can be replaced by the above-mentioned materials to have a complete molded magnetic device. Thus the scope of the invention should be determined by the appended claims and their legal equivalents, rather than by the examples given.

I claim:

1. In combination, an eyeglass assembly and two magnet assemblies, the eyeglass assembly comprising two temple supports and a bow portion, the temple supports being jointedly attached to opposite ends of the bow portion, the temple supports thus being pivotable intermediate a closed temple support position and an open temple support position, the temple supports extending in opposite directions in adjacency to one another when in the closed temple support position, the magnet assemblies each comprising a magnetic member, a magnet-encasing shell, and first and second flexible hinge rings, each magnetic member comprising opposing first and second magnet ends, the magnet-encasing shell enclosing the magnetic member, the first and second hinge rings being hingedly connected to the magnet-encasing shell adjacent the first and second magnet ends, a selected magnet assembly being removably attached to each temple support via the first and second hinge rings such that the magnetic members may be juxtaposed to one another when in the closed temple support position, the magnetic members for magnetically maintaining the temple supports in the closed temple support position via cooperative magnetic force extending therebetween, the magnet assemblies being manually removable from the temples supports for enhancing safe wear of the eyeglass assembly.

2. The combination of claim 1 comprising eyeglass-supporting means, the eyeglass-supporting means extending intermediate the bow portion and the temple supports when in the closed temple support position, the eyeglass-supporting means and the magnet assemblies for supporting the eyeglass assembly and safely stowing the eyeglass assembly when in the closed temple support position.

3. The combination of claim 1 wherein the hinge rings are formed from pliable, flexible material, the pliable, flexible material for enhancing a user's ability to manually and removably attach the magnet assemblies to the temple supports intermediate the length thereof.

4. The combination of claim 3 wherein the magnet assemblies are repositionable upon the eyeglass temple supports intermediate the length thereof.

5. A combination eyeglass magnet assembly, the eyeglass magnet assembly comprising at least two cooperable magnet assemblies, each magnet assembly comprising a magnetic member, a magnet-encasing shell, and first and second hinge rings, each magnetic member comprising opposing first and second magnet ends, the magnet-encasing shell enclosing the magnetic member, the first and second hinge rings being hingedly connected to the magnet-encasing shell adjacent the first and second magnet ends, the hinge rings for selectively and removably attaching the eyeglass magnet assembly to eyeglass temple supports intermediate the length thereof, the magnetic members being magnetically attracted to one another for directing the temple supports into a closed temple support position.

6. The eyeglass magnet assembly of claim 5 wherein the hinge rings are formed from flexible material, the flexible material for enhancing a user's ability to removably attach the magnet assemblies to the eyeglass temple supports intermediate the length thereof.

7. The eyeglass magnet assembly of claim 6 wherein the magnet assemblies are repositionable upon the eyeglass temple supports intermediate the length thereof.

8. An eyeglass holding device, the eyeglass holding device comprising a magnetic member, a non-ferrous, magnet-encasing shell, and first and second ring structures, the magnetic member being encased in the non-ferrous shell, the ring structures being pivotably attached to the non-ferrous shell to facilitate removable attachment to an eyeglass assembly temple support, the eyeglass assembly temple support being axially receivable through the ring structures for effecting a magnetically claspable temple support.

9. The eyeglass holding device of claim 8 provided in pairs for removable attachment to cooperatively paired eyeglass assembly temple supports, the magnetically claspable temple supports for magnetically maintaining the temple supports in a closed temple support position via cooperative magnetic force extending between the paired eyeglass holding devices.

10. The eyeglass holding device of claim 8 being selectively repositionable upon the temple supports intermediate the length thereof via the ring structures.

11. The eyeglass holding device of claim 10 wherein the ring structures are formed from flexible material, the flexible material for enhancing a user's ability to removably attach and reposition the magnet assemblies relative to the eyeglass temple supports intermediate the length thereof.

* * * * *